Aug. 1, 1967                 W. BORN                3,333,877
METHOD OF AND APPARATUS FOR TYING PACKAGES AND THE LIKE
WITH NON-METALLIC TYING MEANS
Filed Oct. 18, 1965                                  9 Sheets-Sheet 6

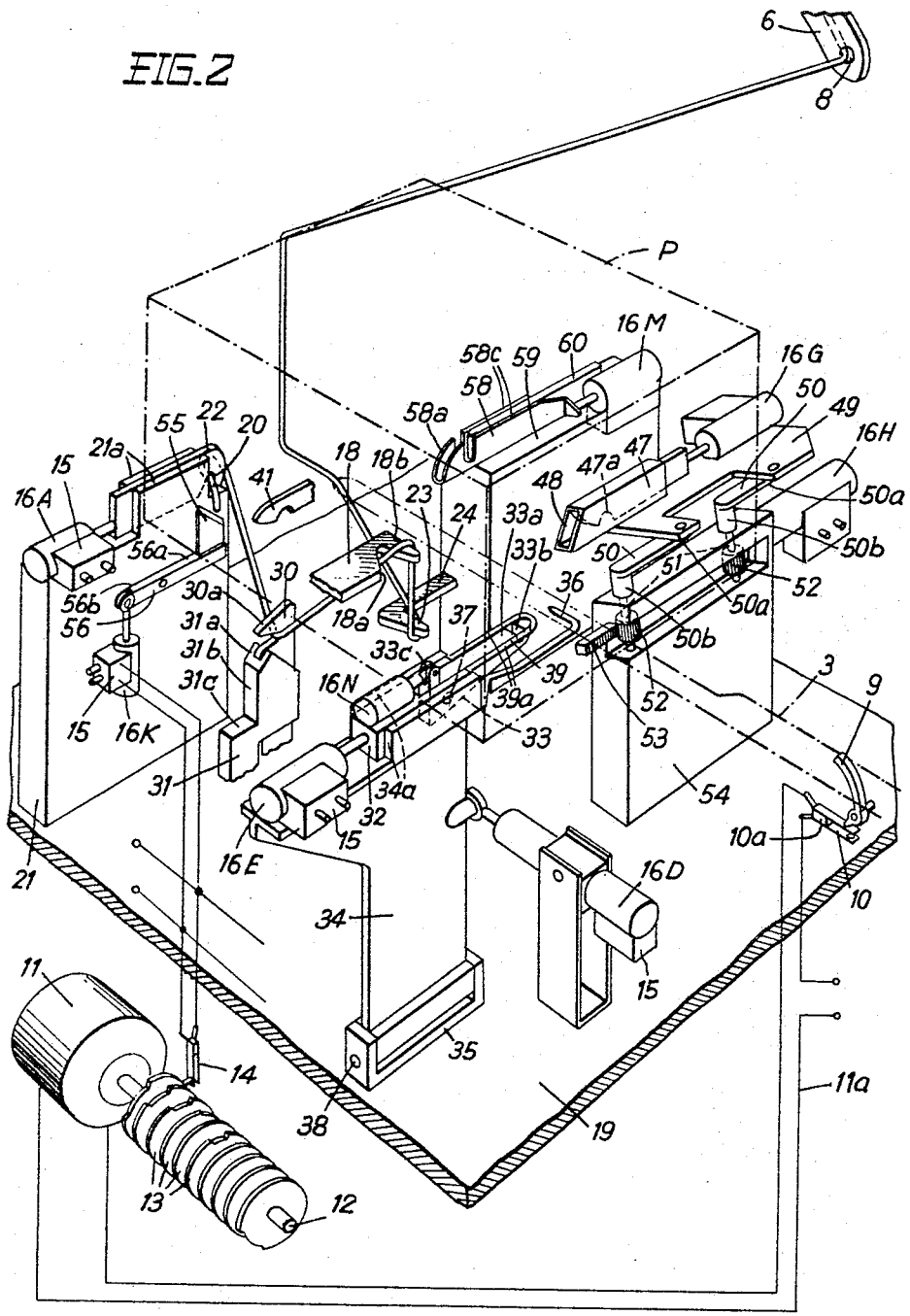

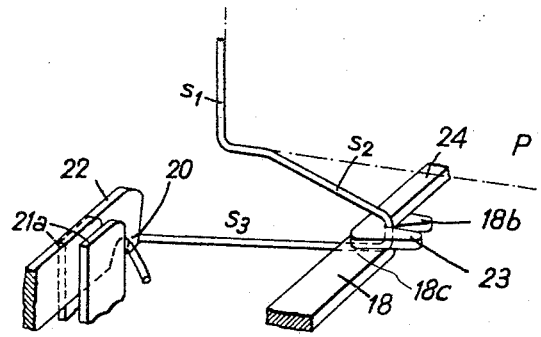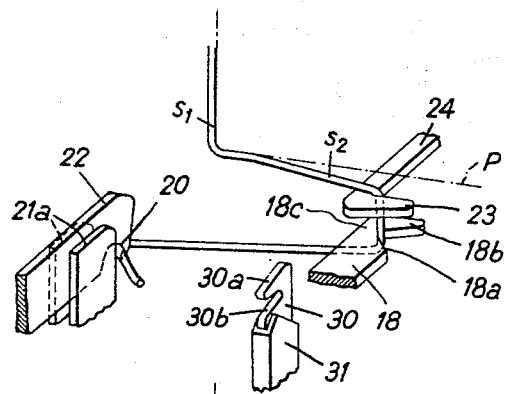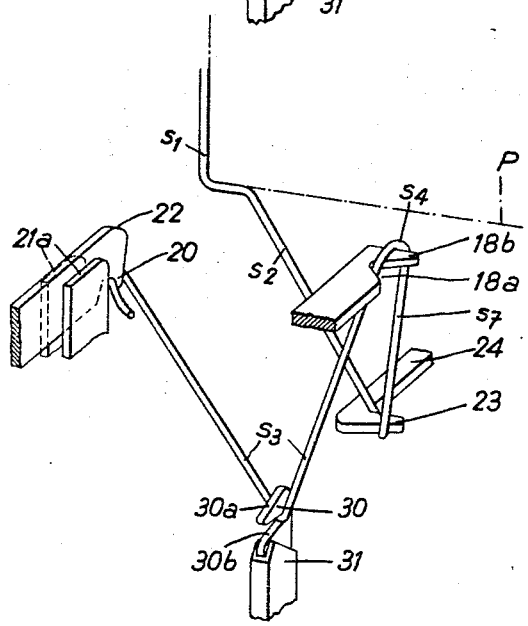

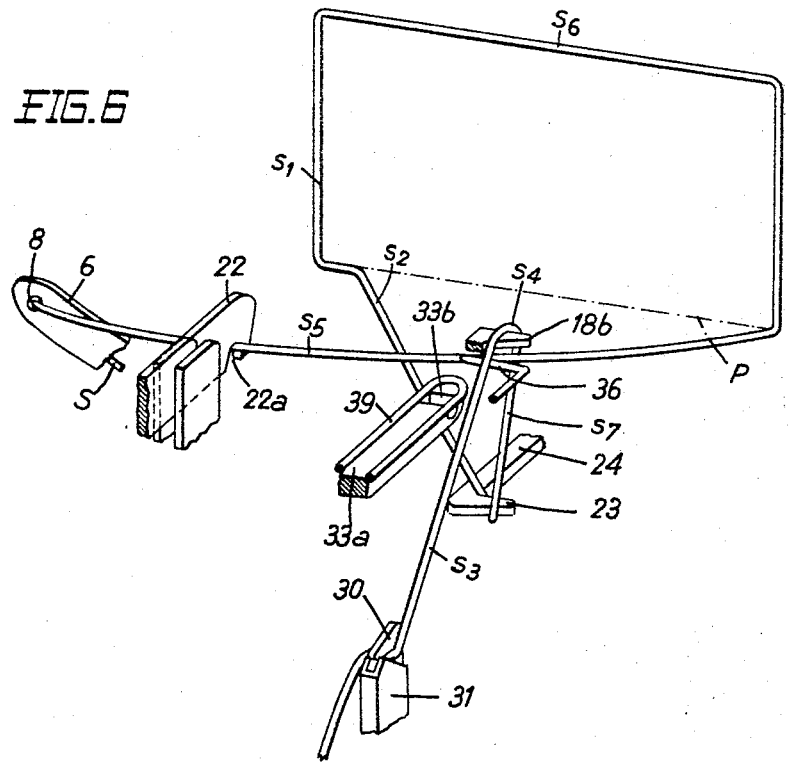
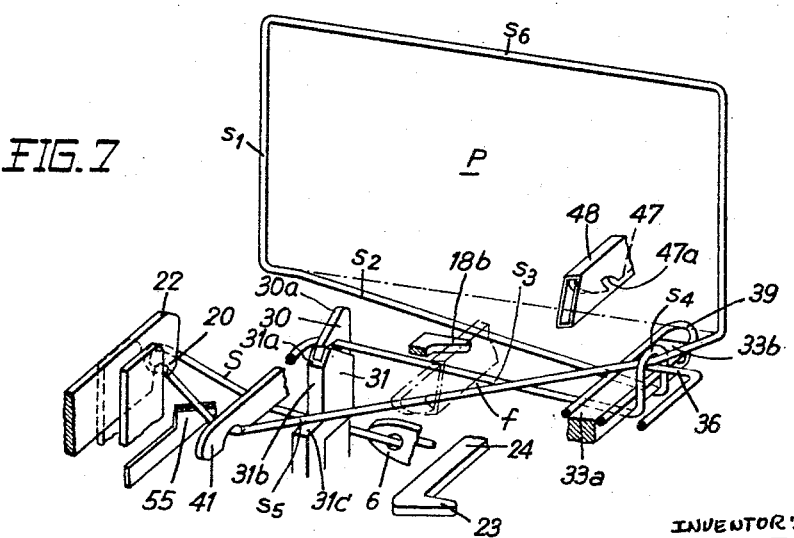

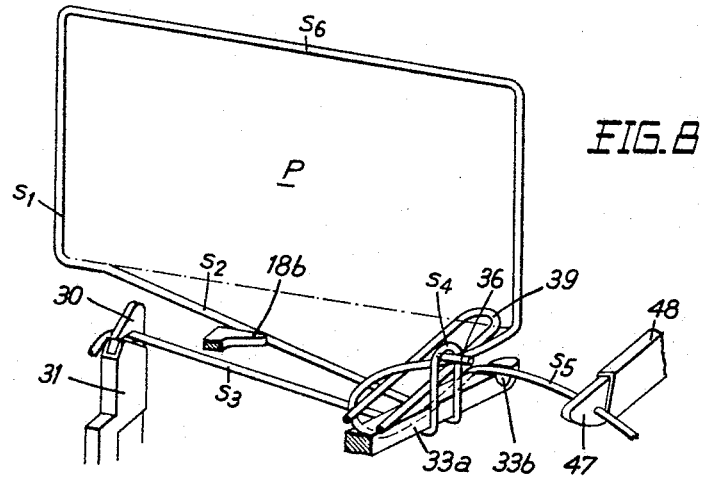
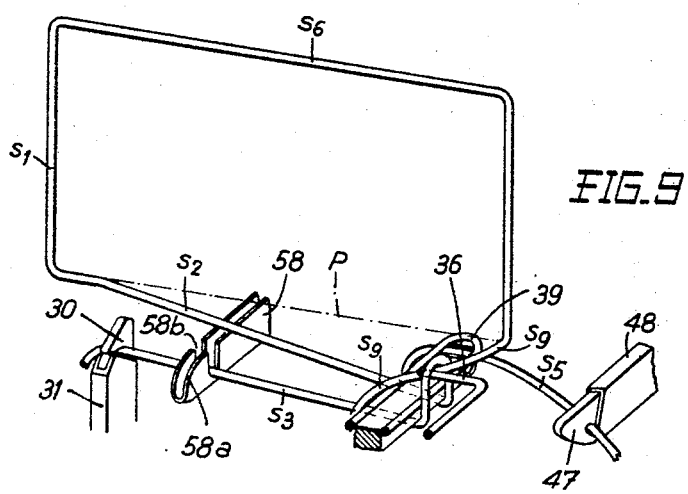

INVENTOR:
WERNER BORN
By Werner W. Kleeman
His Attorney

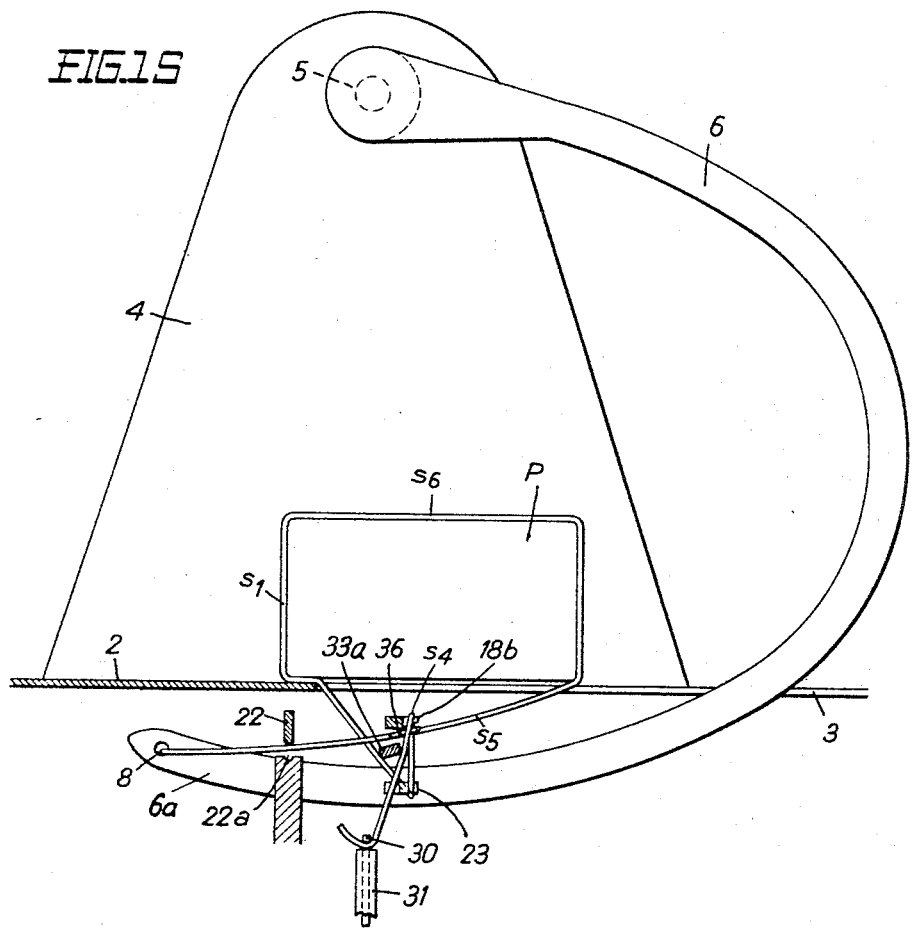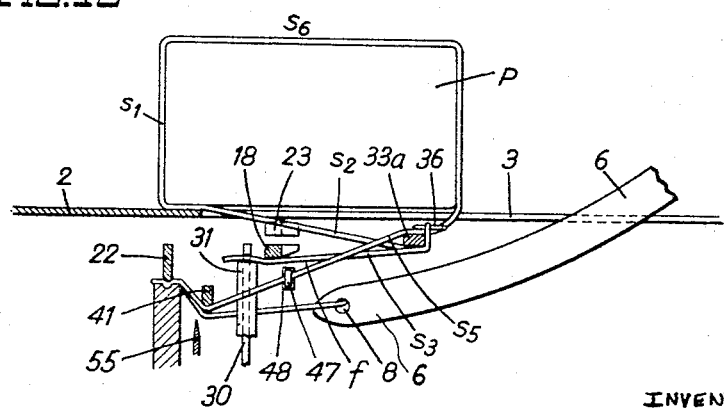

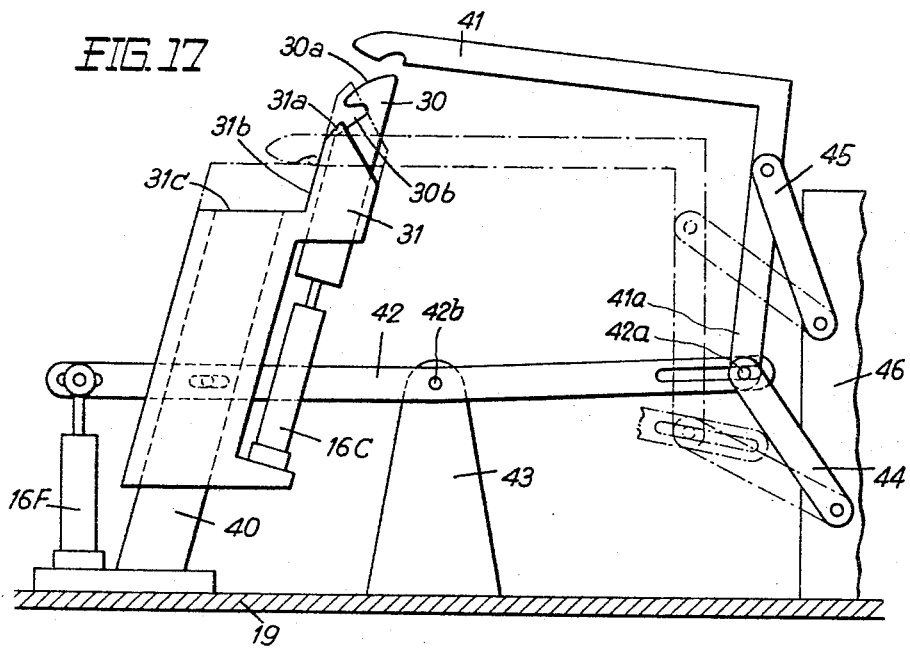
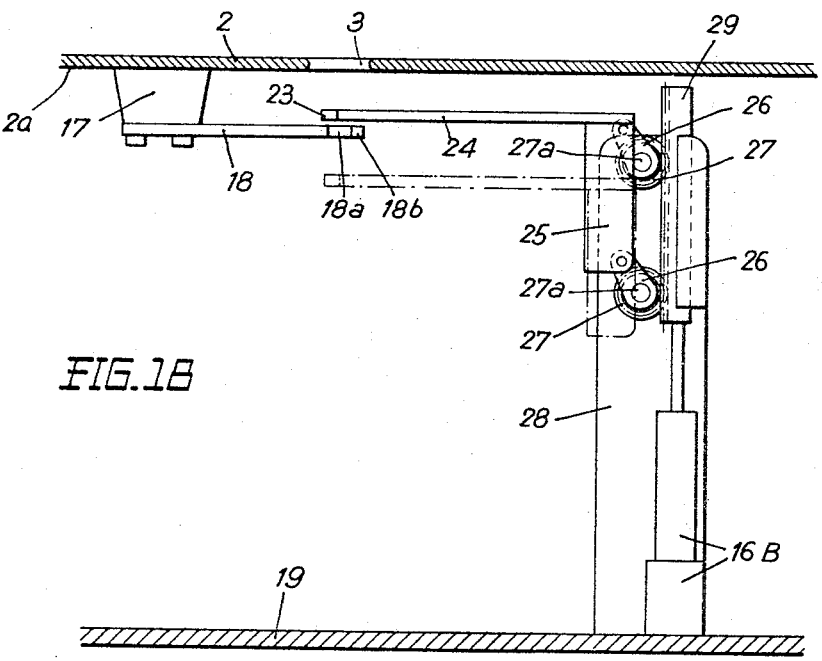

United States Patent Office 3,333,877
Patented Aug. 1, 1967

3,333,877
METHOD OF AND APPARATUS FOR TYING PACKAGES AND THE LIKE WITH NON-METALLIC TYING MEANS
Werner Born, Matt, Hergiswil, Nidwalden, Switzerland
Filed Oct. 18, 1965, Ser. No. 497,026
Claims priority, application Switzerland, Nov. 3, 1964, 14,160/64
20 Claims. (Cl. 289—1.5)

The present invention has reference to an improved method of, and apparatus for, the mechanical knotting of non-metallic tying means, particularly polished and unpolished tying threads, cords, bands, and the like, for instance those formed of nylon, in order to tie packages, parcels and like packed or packaged goods of optional size while forming a so-called "weaver's knot."

A method of this type and an apparatus for the performance of such method are for example known by virtue of German Patent No. 1,100,546. A basic disadvantage of this method is that the formed "weaver's knot" in fact is not a weaver's knot at all, rather a so-called "straight knot," which, as is known, can only again be opened with a great deal of effort. For instance, if the packed material is composed of bundles of newspapers, then it is not readily possible to subject the delivery personnel to the time-consuming work of loosening so many knots. There only then remains the possibility of cutting the tying means.

With several other known methods in which other types of knots are formed there partially exist the same difficulties.

Further problems which exist, among others, during the knotting of non-metallic tying means reside in performing the knotting operation and the therewith associated tying operation in such a manner that the tying means, e.g. cord, lies tautly about the package, and indeed permanently. Furthermore, both operations should be performed quickly, effortlessly and reliably.

There is already known to the art the so-called "crossed weaver's knot," which was only carried out manually and not used for the tying of packed or packaged goods. Here, two loops are secured with respect to one another by means of a transversely extending cord end portion which can form a knot-opening loop. Such possesses all of the advantages of the simple weaver's knot, but, however, the additional important advantage that it exhibits a greater knot strength and owing to the knot-opening loop can be easily opened without resorting to the use of any kinds of tools.

Accordingly, it is a primary object of the present invention to provide an improved method of, and apparatus for tying packages of practically all types and optional size in a manner which overcomes the aforementioned disadvantages of the prior art techniques.

Another important object of this invention is directed to an improved method of, and apparatus for, tying packages and the like wherein there results tight packaging of the goods wrapped, there is formed such a "crossed weaver's knot," and specifically with or without a knot-opening loop, as desired.

A further important object of this invention is the provision of an improved method of tying packages in the manner afore-described by the use of suitable mechanical means which enable such method to be carried out quickly, effortlessly, reliably and completely automatically, this resulting in a large handling capacity for the machine operating according to the inventive method, particularly with mechanical infeed and removal of the packages being processed.

Still a further important object of this invention is to provide an improved method of, and apparatus for, quickly, efficiently and reliably tying packages and the like with non-metallic tying means for desired type and such a manner that there is formed at the thus tied package a crossed weaver's knot.

In order to implement these and still further objects of the invention which will become more apparent as the description proceeds, the inventive method contemplates forming a section of cord, which merges with the cord end removed from a supply source and fixedly held at a clamping location, into inverted U-shaped configuration bearing with its middle portion upon a stationary support nose. Then a cord section which merges with the supply source, after being placed about the package to be tied, is passed beneath the middle region of the inverted U-shaped configured cord section supported upon the stationary support nose and is fixedly held at a distance from such middle portion. Now the middle portion is moved by means of a knotter unit away from the stationary support nose and onto a movable support hook and while supported upon the latter is further moved in the same direction in order to pull and tension the portion of the cord encircling the package. Thereafter, the cord section merging with the supply source and extending from the movable support hook to the clamping location is engaged by a looper or wrap-around mechanism, separated from the supply source and placed in a loop about both legs of the U-shaped configured cord section extending from the knotter unit, and, at the same time, inserted in a projecting portion of this knotter unit. Thereafter, the knotter unit is displaced such that the cut or separated cord section is pulled between the loop formed by the middle portion and the loop formed by the wrap-around mechanism for the purpose of forming a crossed weaver's knot, with or without a knot-opening loop. Then a leg of the U-shaped configured cord section which is still held fast at its end is tensioned in order to tighten the loop formed by said middle portion, and finally by cutting or releasing this fixedly held leg there is completed the work cycle.

Broadly speaking, the exemplary embodiment of inventive apparatus used for carrying out the inventive method comprises a table plate for supporting the packages or otherwise to be tied which incorporates a longitudinal slot A curved arm which is pivotably mounted above said table plate for movement into and out of said slot. This curved arm is provided with an aperture at its free end through which piercingly extends the tying cord coming from its supply source and then such tying cord extends into said longitudinal slot to means providing a stationary clamping location for clamping the free end of the tying cord. Moreover, the inventive apparatus incorporates means providing a stationary support nose for engaging the tying cord passing to the aforesaid stationary clamping location, displaceable looping means cooperating with said stationary support nose for forming a section of said tying cord into substantially inverted U-shaped configuration, means providing a displaceable clamping location for engaging a section of the cord extending from said stationary support nose to said stationary clamping location, knotter means for disengaging the cord section engaged by said stationary support nose and said displaceable looping means, impact means cooperable with said displaceable clamping location-providing means for forming a shed, said impact means during shed formation contacting a cord section extending from said knotter means to said stationary clamping location. There is also provided wrap-around mechanism movable into the shed for engaging the cord section contacted by said impact means, cutter means for cutting said cord section engaged by said wrap-around mechanism in order to free said cord section from its supply source, said wrap-around mechanism cooperating with said knotter means to form a weaver's knot, and means for tightening the formed weaver's knot about the package being tied.

Other features, objects and advantages of the invention will become apparent by reference to the following detailed description and drawings in which:

FIGURE 2 is a perspective view showing the internal structure of the machine of FIGURE 1, partially schematically, and partly omitting portions of certain of the individual mechanisms for the purpose of facilitating illustration;

FIGURES 3 to 10 are fragmentary, perspective views depicting a number of successive steps performed during the operating cycle;

Figure 11:
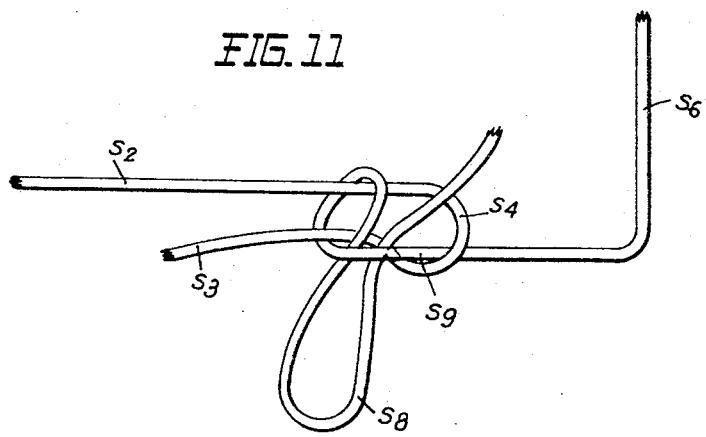
Figure 12:
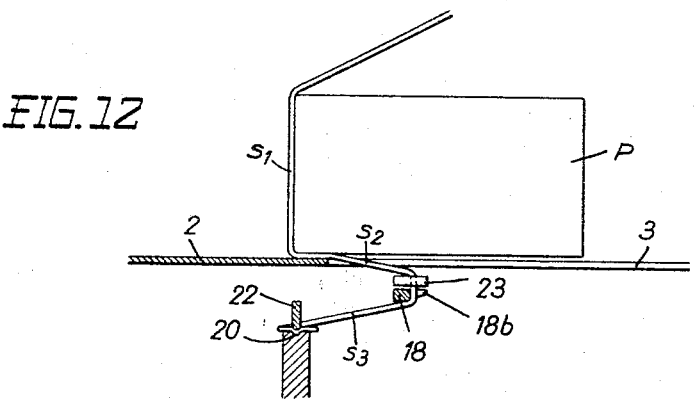
Figure 13:
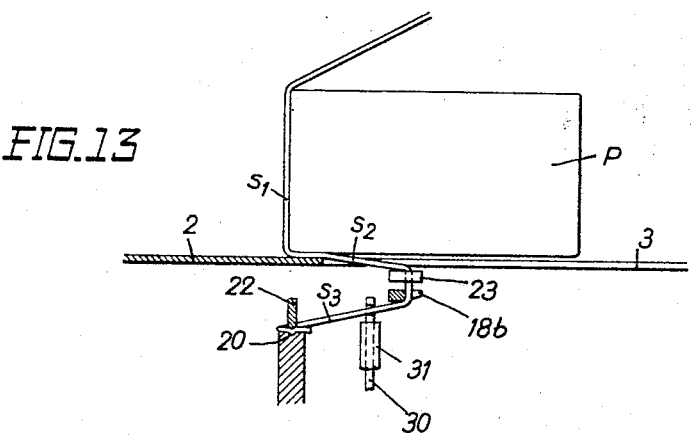
Figure 14:
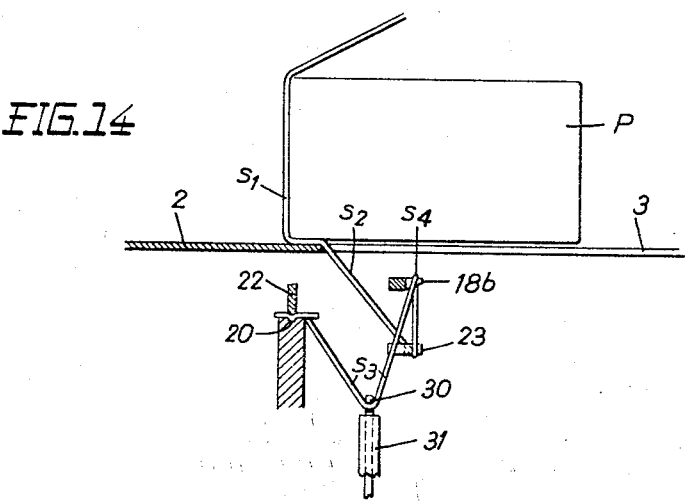

FIGURE 11 schematically illustrates the so-called crossed weaver's knot, and in order to more clearly illustrate such, the individual cord sections of the tying cord or the like have been depicted with the formed knot in slack condition;

FIGURES 12, 13, 14, 15 and 16 are vertical sectional views which correspond to FIGURES 3, 4, 5, 6 and 7 respectively, and illustrate in somewhat greater detail the structure and operation of the different mechanisms employed in carrying out the various corresponding operating steps;

FIGURE 17 is a side elevational view depicting details of one of the mechanisms employed in the machine for carrying out the inventive method, and not fully shown in FIGURE 2; and FIGURE 18 is a side elevational view depicting details of one of the other mechanisms of the machine, namely that one which carries out the operating steps depicted in FIGURES 3 and 4, as well as in FIGURES 13 and 14.

Figure 1:
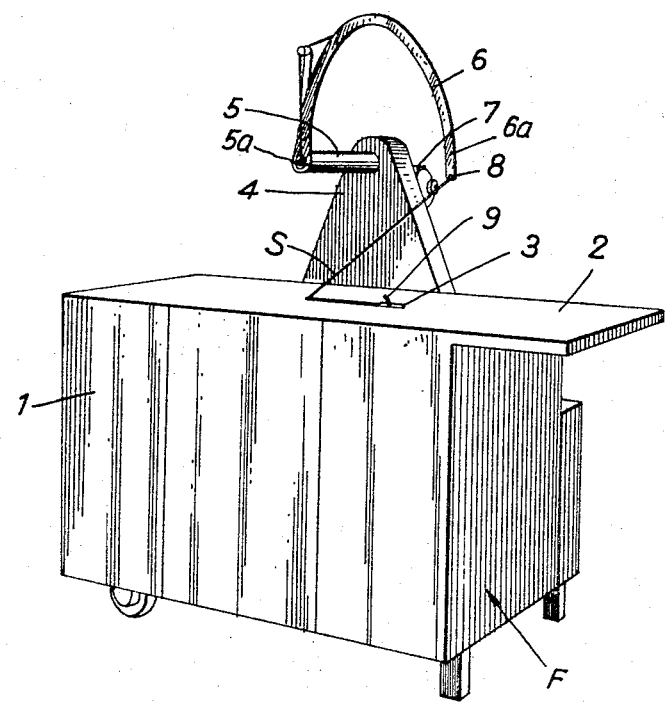
FIGURE 1 is a perspective view of a preferred embodiment of inventive machine for carrying out the inventive method.
Figure 10:
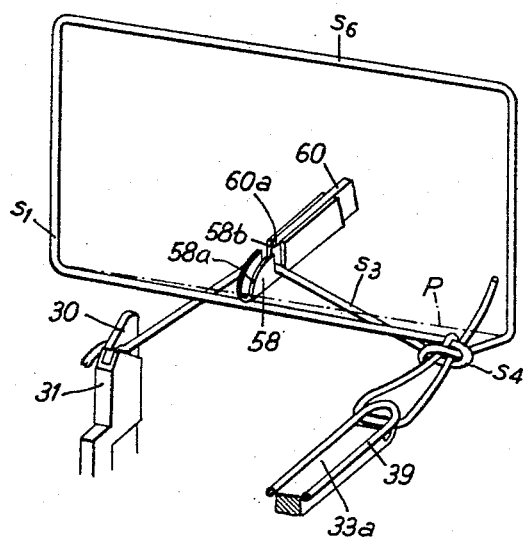

The exemplary illustrated embodiment of machine employed for carrying out the inventive method, which is depicted in FIGURE 1 in contour and in preparatory condition, embodies a frame F enclosed by walls 1 and a table plate 2 resting upon such walls. Table plate 2 possesses a longitudinal slot 3. A support 4 is affixed to the lengthwise face or side of the frame F and at which a hollow shaft 5 is rotatably mounted for to and fro movement. An arcuate-shaped or curved arm 6 is fixedly seated at that end of the hollow shaft 5 which is disposed in the same vertical plane as the longitudinal slot 3. A non-illustrated holder is mounted to the support 4, upon which there is exchangeably supported a supply roll 7 for a suitable tying strand, such as cord S. The cord, rope, thread, string, ribbon, or whatever type tying strand is employed—generally hereinafter conveniently referred to as a "cord S"—is withdrawn from this supply roll 7, passes through the inner channel 5a of the hollow shaft 5, and then past suitable thread tensioning and guide means accommodated at the arm 6 and which have not been shown in any great detail because the details of such physical structure do not form part of the subject matter of this invention, nor are they necessary to understand the inventive concepts, particularly since arms equipped in the previously considered manner are well known to the art from other package-tying machines. Further, it will be seen that an aperture or hole 8 is provided at the free end 6a of the arm 6, through which piercingly extends the cord S, and from which location, during standstill of the machine, it extends to and through the longitudinal slot 3 and into the interior of the machine where it is then fixedly held at its end at a location which will be described in detail shortly.

A package, bundle of packages, parcel or other type packaged goods which are to be tied—generally hereinafter conveniently referred to as "package P"— is displaced from the right to the left across the table plate 2 until its middle portion is located approximately beneath the hollow shaft 5. In so doing, it actuates the feeler member 9 of a switch 10a, such feeler member 9 being arranged at the right-hand end of the slot 3. Switch 10a possesses contacts 10 (FIGURE 2) arranged in the current supply circuit 11a of a well known electric motor 11, which after completing a single rotation is automatically shut off.

A number of juxtapositioned cam discs 13 are fixedly mounted upon the shaft 12 of this electric motor 11. A pair of switch contacts 14 are operably associated with each such cam disc 13, although for convenience in illustration only one such pair has been depicted in FIGURE 2. Each pair of switch contacts 14 controls the current circuit of an associated conventional electric valve 15. Each such electric valve 15 is operably associated with a double-acting cylinder and piston unit, such as the one indicated by reference character 16K (FIGURE 2). The cylinder and piston units of the machine have conveniently been designated by reference characters 16A, 16B, 16C, . . . 16N, although they differ somewhat from one another with respect to diameter and length of stroke. All of them are also operably connected with a standard compressed air distributor network or a network for the distribution of pressurized oil or the like. Such type pneumatic or hydraulic actuating mechanisms and their control by expedients such as elements 11 to 15 are well known to the art and thus need not be considered in greater detail.

By referring to FIGURE 18, it will be recognized that a rigid plate 18 is secured to the underface 2a of the table plate 2 through the intermediary of a block 17. This rigid plate 18 possesses a V-shaped cut-out or notch 18a disposed beneath the lengthwise slot 3. Moreover, the terminal portion 18b of the plate 18 situated behind this notch or cut-out 18a will hereinafter be referred to as a "stationary support nose."

Reference character 19 designates a base plate affixed to the frame of the machine and arranged in parallelism with, and at a spacing beneath, the table plate 2. Upon this base plate 19 there are secured the stationary supports for different operable mechanisms, the latter having been clearly depicted in FIGURE 2 and in the further amplifying FIGURES 17 and 18. However, understanding of these mechanism is best realized in conjunction with the explanation of the method practised by means of the inventive machine. For this reason, they will only be described in detail during discussion of the inventive method, which will be undertaken with particular reference to FIGURES 3 to 10 and 12 to 16. The elements or components appearing in such figures have been marked with the same reference characters as in FIGURES 2, 17, and 18.

As previously developed in connection with FIGURE 1, in the rest or preparatory condition of the machine the cord S extends from the free end 6a of the arm 6 which assumes its highest position, to the slot 3 of the table plate 2, from there to the cut-out or notch 18a of the rigid plate 18, then to a stationary clamping location 20. Clamping location 20 is formed by the bifurcated upper portion 21a of an upright plate member 21 secured to the base plate 19 and a clamping slide 22 having a V-shaped notch 22a and arranged between this bifurcated upper portion 21a and displaceable to and fro by means of the cylinder and piston unit 16A. In this rest or preparatory condition, a looping or wrap-around hook 23 engages over the shank portion 18c of the stationary support nose 18b, in other words, over the plate 18, as such is clearly depicted in FIGURES 3 and 18. The rearwardly extending shank 24 of this looping hook 23 is secured to a support or carrier 25 mounted upon two crank arms 26 arranged beneath one another, as best seen by referring to FIGURE 18. These crank arms 26 are seated upon the pin members 27a of two pinions 27 also mounted beneath one another at a support 28, such pinions 27 meshing with a single gear rack 29 which can be actuated by an associated cylinder and piston unit 16B.

The package P to be wrapped is shown in phantom lines in FIGURES 2 to 10. When it is advanced along the table plate 2 into the position suitable for carrying out the tying operation, particularly discernible in FIGURE 2, it entrains the section $S_1$ of the cord S extending from the hole 8 of the arm 6 to the longitudinal slot 3 and also the succeeding cord section S situated beneath the table plate 2. These cord sections $S_1$ and $S_2$ then extend approximately in the manner depicted in FIGURE 3. Due to actuation of the feeler arm 9 of the switch 10a by means of the package P, the switch contacts 10 are closed and the electric motor 11 is switched on. This results in the automatic execution of the remainder of the process in that, the individual cylinder and piston units 16A, 16B, etc. actuate the associated mechanisms at the required time intervals and sequence due to the cam discs 13 operating the various electric valves 15 via the relevant contact pairs 14.

Now by inspecting FIGURE 4, it will be appreciated that in a first operating phase and due to downward movement of the toothed rack 29 (FIGURE 18) by the cylinder and piston unit 16B, the looping hook 23 is moved along a circular path slightly upwards, towards the rear and considerably more downwards, until finally reaching the position depicted in FIGURE 5. At the same time, a clamping hook 30 is raised, by means of the cylinder and piston unit 16C, in a guide element 31 at a direction somewhat inclined to the vertical (FIGURE 17). The roof portion 30a of this clamping hook 30 is downwardly inclined towards the front. As a result, it momentarily presses the cord section $S_3$ extending from the cut-out 18a to the clamping location 20 somewhat forwardly, whereafter this same cord section $S_3$ jumps into the hook-shaped opening 30b of this clamping hook 30. Thereafter, the clamping hook 30 is again moved downwards, approximately together with the looping hook 23, with the result that the cord section $S_3$ is downwardly tapered, as clearly shown in FIGURE 5. From the above developed discussion it follows that, by virtue of the previously described movements of the looping hook 23 and the clamping hook 30, the cord section removed from the supply source or roll 7 and merging with the cord end fixedly held at the clamping location 20 has been substantially formed into the shape of an inverted U, the central portion or section $S_4$ of which bears upon the stationary support nose 18b of the rigid plate 18.

During the operations which have just been explained in conjunction with FIGURES 4 and 5, the arm 6 has been moved in clockwise direction (FIGURES 2 to 10) by means of its non-illustrated actuating means, which for instance can comprise a cylinder and piston unit of a toothed rack drive arrangement with a chain drive. As a result, the cord section $S_6$ withdrawn from the supply roll 7 is applied to the package P. The arm 6 is rotated to such an extent that it now has approximately reached the terminal position depicted in FIGURES 6 and 15. In so doing, its free end 6a with the hole 8 just passes beneath the V-shaped notch or cut-out 18a located forwardly of the stationary support nose 18b and also beneath the V- or hook-shaped notch or cut-out 22a of the clamping slide 22 which, in the meantime, has been forwardly displaced, whereby the cord end thus released from the clamping location 20 is now fixedly held by the clamping hook 30 in conjunction with its guide portion 31 (FIGURE 6). The cord section $S_5$ which has also been passed beneath the stationary support nose 18b is now fixedly retained in the stationary clamping location 20 due to renewed retraction of the clamping slide 22, as such is best shown in FIGURE 7.

Thereafter, a number of operations take place more or less at the same time. The arm 6 is rotated or turned back. Furthermore, a knotter means comes into operation. Such is constructed in the following manner: A pivot plate 34 arranged at a support element 35 stationarily seated upon the base plate 19, is mounted for rotation upon a shaft 38 extending from the front towards the rear. The pivoting or oscillatory movement of this plate 34 is carried out by means of a cylinder and piston unit 16D. A knotter plunger or ram 32 is displaceably arranged in a forked upper portion 34a of the pivot plate 34 and can be forwardly and rearwardly displaced by means of a cylinder and piston unit 16E. A tapered knotter lever 33 is pivotably mounted to the knotter plunger 32 by means of a pin member 37, the rearwardly extending arm 33a of which will be conveniently hereinafter referred to as "knotter tongue." The movable portion of a cylinder and piston unit 16N engages with the upwardly extending arm means 33c of the knotter lever 33 and the stationary portion is affixed to the knotter plunger 32. The knotter tongue 33a also possesses a transversely extending groove or slot 33b and is normally pressed against a rigid retaining member 39 formed of U-shaped flexed wire, the legs 39a of which are fixedly mounted at the knotter ram or plunger 32. Moreover, a bent or flexed support hook 36 advantageously formed of stiff wire is secured to the rear end of the pivot or oscillating plate 34.

Due to actuation of the knotter plunger or ram 32, the knotter tongue 33a and the retaining member 39 enter into the cord-triangle formed by both of the cord sections $S_2$ and $S_7$ extending to and past the looping hook 23, and further by the cord section $S_5$ just passed beneath the stationary support nose 18b. This is best ascertained by referring to FIGURES 6 and 15. Thereafter, the pivot plate 34 is rocked towards the right, i.e. away from the stationary clamping locations 20, so that the knotter tongue 33a and the support hook 36 move along a circular-shaped path towards the right and quite close to the underface 2a of the table plate 2 and the package P located thereon. Due to this, the middle cord section or portion $S_4$ is displaced away from the stationary support nose 18b and, consequently, also pushed onto the movable support hook 36. With continued rocking of the pivot plate 34 and with continuous retention of the cord section $S_5$ at the stationary clamping location 20, and the cord section $S_3$ by the clamping hook 30 and the cooperating guide portion 31, a strong pulling force is exerted upon the cord section $S_2$. As a result, the cord section $S_6$ (including the section $S_1$; FIGURE 7), which encircles the package P at three sides, is pulled and tensioned.

At the end of this operation and due to actuating the cylinder and piston unit 16F (FIGURE 17), the movable guide element or portion 31 together with the clamping hook 30, are raised along the stationary guide portion 40 while entraining the cord section $S_3$, and furthermore, the portion of the cord section $S_5$ located between the elements 30, 31 and the clamping location 20 is downwardly flexed by means of an impact arm 41 (FIGURES 7 and 16). In this manner a shed $f$ is formed between the cord section $S_3$ and the cord section $S_5$. Actuation of the guide element 31 by the cylinder and piston unit 16F takes place through the agency of a double-arm lever 42 (FIGURE 17) pivotably mounted, at 42b, to a support 43 secured to the base plate 19, and by means of a slide articulation or connection 42a at one end is operably connected with a downwardly depending flexed portion 41a of the impact arm 41 as well as also with a guide rod 44. This guide rod or link 44 and a second guide link 45 articulated further towards the top to the downwardly flexed porton 41a of the impact arm 41, are mounted at a stand or block 46 secured to the base plate 19. By way of completeness it is still mentioned that, during such times as the cord section $S_5$ is flexed by the impact arm 41, it first slides along the roof portion 30a (FIGURE 17) of the clamping hook 30, then upon an approximately inclined surface 31a of the movable guide portion 31 and then along a surface 31b extending in the direction of movement of this guide portion 31, until it comes to bear upon a horizontal stepped portion 31c of this guide element or portion 31.

At the beginning of a further phase of the work cycle, a looper or wrap-around mechanism enters the previously mentioned shed $f$. This looper mechanism is primarily composed of a looper-gripper 47 having a V-shaped notch 47a and an associated guide sleeve 48 (FIGURE 2). The latter is secured to a support plate 49, as is also the cylinder and piston unit 16G to forwardly and rearwardly displace the looper-gripper 47. The support plate 49 is mounted at the free ends 50a of two crank arms 50, the hubs 50b of which are seated at the upper ends of the journal pins 51 of two pinions 52. These pinions 52 mesh with a toothed rack 53 provided with the cylinder and piston unit 16H for purposes of actuation. The pins 51 rotate in the bores of an upright stand 54 secured to the base plate 19, such pin bores being inclined with respect to the vertical at an angle of for example 15°, so that the plane of movement of the crank arms 50 and the support plate 49 are also inclined to the horizontal at a corresponding angle.

When the wrap-around or looper mechanism 47, 48 is introduced into the shed $f$ it is open, in other words, ready to seize the cord section $S_5$; it is also located forwardmost and downwards. As soon as the cord section $S_5$ has entered the V-shaped or hook-shaped opening 47a of the looper-gripper 47, the latter is retracted for the purpose of fixedly retaining this cord section $S_5$ in cooperation with the looper guide sleeve 48. Directly thereafter the portion of the cord section $S_5$ extending between the impact arm 41 and the stationary clamping location 20 is severed by a knife or cutter 55 (FIGURES 2 and 7), secured to the rear end 56a of a double-arm lever 56 mounted at the stand 21 and whose other end 56b is engaged by an associated cylinder and piston unit 16K.

The looper or wrap-around mechanism 47, 48 moving to the right along a circular path in consequence of the rotation of the crank arms 50, places the cord section $S_5$ which has been severed from the supply source 7 from below into a loop about both of the cord U-legs $S_2$ and $S_3$ extending beneath and past the knotting tongue 33a, as shown in FIGURE 8. During continuation of its movement, the looper mechanism 47, 48 deposits this cord section $S_5$ into the transverse knotter groove 33b of the knotter tongue 33a, which in the meantime has been pivoted somewhat downwards by the cylinder and piston unit 16N. There thus results the condition depicted in FIGURE 8. During the remainder of the return rotation of the crank arms 50, the cord section $S_5$ is still somewhat pulled by the looper mechanism 47, 48, and the just formed loop somewhat tensioned. At the same time, the knotter tongue 33a is again rocked upwards into its starting position. The cord section $S_5$ is then secured from falling out of the transverse knotter groove 33b by the retaining member 39 (FIGURE 9). It is still to be mentioned that the upward movement of the knotter unit 32, 33, 39, and in particular the knotter tongue 33a, which is obtained by rocking the plate 34, corresponds to the upward movement of the wrap-around or looper mechanism 47, 48 resulting from moving the crank arms 50 in the aforementioned plane inclined at about 15° to the horizontal.

During retraction of the knotter unit 32, 33, 39 this cord section $S_5$ situated in the transverse knotter groove 33b is pulled between both of the previously formed loops, namely the first loop which is composed of the U, having legs $S_2$ and $S_3$, and the middle portion $S_4$ of which initially bears upon the stationary support nose 18b and then upon the support hook 36, and the second loop formed by the looper mechanism 47, 48. During this through-pulling operation, the cord section $S_5$ slides in the hook-shaped notch 47a of the looper-gripper 47 in order that there results the cord length from which there is formed the knot withdrawal or opening loop $S_8$, both legs of which extend beneath the cord strand portion $S_9$ which merges with the cord portion or section $S_6$ placed about the package P or otherwise. (The cord strand portion $S_9$ comprises the starting portion of the cord section $S_5$ in the work cycle according to FIGURES 7 and 16.) Consequently, the crossed weaver's knot is formed as such is depicted in FIGURE 11. In the event that retraction of the knotter unit 32, 33, 39 is terminated, as soon as the portion of the withdrawal or opening loop $S_8$ formed by the terminal portion of the cord section $S_5$ has been pulled through the cord strand portion $S_9$, there then remains the withdrawal loop $S_8$. In the other case, there only results a simple crossed weaver's knot without such a withdrawal loop $S_8$. At the end of the return movement of the knotter ram or plunger 32, the knotter lever 33 is pivoted by the cylinder and piston unit 16N in the sense of downwardly flipping the knotter tongue 33a for the purpose of releasing the withdrawal loop $S_8$.

In the now prevailing condition the crossed weaver's knot, with or without knot opening or withdrawal loop $S_8$, is still loose. In order to tighten the thus formed knot it is still necessary to pull upon the loop formed by the U, incorporating the cord sections $S_2$, $S_3$, with the central portion $S_4$, specifically by exerting a pulling force upon the cord section $S_3$. For this purpose there is provided a pulling gripper 58 which is mounted upon a support 59 so as to be displaceable from the rear towards the front and back again, and which is actuated by the cylinder and piston unit 16M. Forward displacement of this pulling gripper 58 already takes place at the beginning of the withdrawal of the knotter unit 32, 33, 39, whereby the cord section $S_3$ slides over and past the curved forward edge 58a of such pulling gripper 58 and then falls into its slot or cut-out 58b (FIGURE 9). Return movement of pulling gripper 58, in other words the tightening of the cord section $S_3$, takes place together with the withdrawal of the knotter unit 32, 33, 39 during the formation of the crossed weaver's knot. After pulling upon the cord section $S_3$ has been completed, in other words upon termination of tightening of the knot, the pulling gripper 58 is in the position depicted in FIGURE 10, in which the portion of the cord section $S_3$ disposed in the cut-out or slot 58b is pressed against the knife edge 60a formed at the forward portion of a knife or cutter 60. This cutter 60 is located between both legs 58c of the pulling gripper 58, which in cross-section possesses a U-shaped configuration, and is then secured at its rear to the support 59.

As soon as tightening and subsequent separation or cutting of the cord section $S_3$ has been completed in order to free such, the clamping hook 30 is then raised in the guide element 31 for the purpose of releasing the cord piece remaining after cutting of the cord section $S_3$. It would be also conceivable to dispense with cutting the cord section $S_3$ and to simply free it by releasing such after completion of tightening of the weaver's knot by raising the clamping hook 30, in which case then a longer cord portion would merely depend from the knot.

The work cycle is completed after cutting or releasing the cord section $S_3$ and the tied package P can be pushed off the table plate 2.

During such time as the knotter unit and the looper mechanism 47, 48 have operated the arm 6 has been turned back into its starting position. However, the end portion of the cord section has been fixedly retained in the stationary clamping location 20, which in the position of FIGURE 6 has been deposited into the cut-out or slot 22a of the clamping slide 22. It is for such reason that upon return rotation of the arm 6 there results, due to withdrawal of cord from the supply, the cord section which always travels from the clamping location 20 to the hole 8 of the arm 6. In the preparatory position depicted in FIGURE 1 a portion of this cord section extends between the longitudinal slot 3 and the hole 8 of the arm 6. From it there is formed at the beginning of the next working cycle, that is, upon pushing forward the next package P which is to be tied, the cord sections or portions $S_1$ and $S_2$.

In order to place the machine in operation the cord S is passed through the hollow shaft 5 and through the cord tensioning and guide means provided at the arm 6, whereby this arm 6 is located in its uppermost position depicted in FIGURE 1. Thereafter, the cord S depending from the hole or opening 8 of the arm 6 is manually pulled and the end of the cord is held fast at the left-hand end of the slot 3 for such time until the machine has carried out a work cycle triggered by actuating the feeler 9. In so doing, and in accordance with what has been previously explained, the arm 6 places the cord S at the clamping location 20, whereafter the cutter 55 severs the cord between the clamping location 20 and the end which is held by the hand. The cut cord portion held by the hand is thrown away.

From the above description it will be recognized that at no period of time is there more than one cord portion held in one and the same stationary or moving clamping location. As a result, there is guaranteed that there does not occur any sliding of cord in one of these clamping locations, irrespective of the thickness and surface characteristics of the employed cord. Due to this it is possible to use the most different type tying material, for instance, textiles such as hemp rope, wool, jute, or plastics such as PVC (polyvinyl chloride) or nylon, whereby the cord cross-section can be round or flat, hexagonal-shaped for example.

In the above-described embodiment there is provided as the actuating means double-acting cylinder and piston units 16A, 16B, ... 16N which are operated by means of compressed air or pressurized liquid. Instead of such it is, however, possible to provide shafts with cam drives, or, in fact, any other suitable equivalent drive arrangement.

While there is shown and described a present preferred embodiment of the invention it is to be distinctly understood that the invention is not limited thereto but may be otherwise variously embodied and practiced within the scope of the following claims.

What is claimed is:

1. Method of tying packages of desired size by mechanically knotting non-metallic tying means thereabout, such as a tying cord, for the purpose of forming a weaver's knot, comprising the steps of: fixedly holding at a given location an end of the cord removed from a supply source, then forming a section of the cord which merges with the fixedly held end thereof to substantially possess an inverted U-shaped configuration, supporting the middle region of the thus formed inverted U-shaped configured cord section upon a stationary support nose, then placing the cord about the package to be tied, thereafter passing a section of the cord which merges with the supply source beneath said middle region of said inverted U-shaped configured cord section supported upon said stationary support nose, and fixedly holding at said given location the thus passed cord section at a distance from said middle portion, moving by means of a knotter unit said middle portion away from said stationary support nose and onto a movable support hook, next further moving such middle portion located upon said movable support hook in the same direction in order to pull and tension the cord encircling the package to be tied therearound, then engaging by means of a wrap-around mechanism the section of the cord extending from the movable support hook to said given location at which this last-mentioned cord section is fixedly held and cutting such cord section to separate it from the supply source, then placing the cut cord section by means of the wrap-around mechanism in the form of a loop about the legs of said U-shaped configured cord section extending away from said knotter unit and at the same time inserting such cut cord section in a protruding portion of the knotter unit, thereafter displacing the knotter unit such that said cut cord section is pulled between the loop formed by said middle portion and the loop formed by said wrap-around mechanism and beneath a section of the cord extending from the last-mentioned loop to the package in order to form a crossed weaver's knot, thereafter tensioning a leg of said U-shaped configured cord section which is still held fast at its end in order to tighten the loop formed by said middle portion, and finally freeing the aforementioned fixedly held leg to complete the work cycle.

2. Method of tying packages as defined in claim 1, wherein said cut cord section is pulled by said knotter unit only to such an extent that there is formed a crossed weaver's knot having a knot-opening loop.

3. Method of tying packages as defined in claim 1, wherein said cut cord section is pulled by said knotter unit to such an extent that there is formed a crossed weaver's knot devoid of a knot-opening loop.

4. Method of tying packages as defined in claim 1, wherein the step of freeing said fixedly held leg is performed by cutting thereof.

5. Method of tying packages as defined in claim 1, wherein the step of freeing said fixedly held leg is performed by releasing it at the point at which it is held.

6. Method of tying packages as defined in claim 1, including the step of displacing the package to be tied at the beginning of the work cycle along a table plate having a lengthwise slot through which the cord coming from the supply source extends and is fixedly held at its end at said given location, to thereby bring the cord section extending through said slot to said given location into engagement with a shank portion of said stationary support nose and a shank portion of a looping hook located above said stationary support nose, and wherein the step of forming said inverted U-shaped configured cord section is carried out by engaging the cord section extending from said stationary support nose to said given location by displaceable gripper means and flexing the thus engaged cord section downwards while at about the same time also downwardly flexing the section of the cord extending from the stationary support nose to the lengthwise slot of the table plate by sequentially displacing said looping hook upwards, rearwards and downwards relative to said stationary support nose, thereafter releasing the end of the cord section extending from said stationary support nose to said given location and fixedly clamping at said gripper means the portion of said last-mentioned cord section which was downwardly flexed by said gripper means, said given location then being free for fixedly holding the aforesaid cord section which in the next operating step is passed beneath the middle region of the inverted U-shaped configured cord section supported upon said stationary support nose.

7. Method of tying packages as defined in claim 6, wherein said step of moving said middle portion away from said stationary support nose includes the operation of displacing said knotter unit with its frontal portion through a triangle of cord sections formed by the cord section extending from the package to the looping hook and from the looping hook to the stationary support nose as well as the aforesaid cord section passed beneath the stationary support nose.

8. Method of tying packages as defined in claim 7, wherein the step of moving said middle portion located upon said stationary support nose in order to pull and tension the cord encirculing the package is further carried out by displacing the knotter unit laterally along an ascending path and as close to the underface of the table plate and the package located thereon as possible, so that the cord section extending from the knotter unit to the package is removed from the looping hook and from the stationary nose and onto the movable support hook.

9. Method of tying packages as defined in claim 6, wherein after the step of pulling and tensioning the cord encircling the package, the cord section held by said displaceable gripper means is rocked upwardly by raising said displaceable gripper means and the cord section passed beneath said stationary support nose is flexed downwardly in order to build a shed through which said wrap-around mechanism can be inserted and which thereafter engages said downwardly flexed cord section.

10. Method of tying packages as defined in claim 6, wherein said wrap-around mechanism is displaced along a substantially circular path disposed in a plane inclined to the horizontal, so that during formation of said loop by said wrap-around mechanism the latter passes as close as possible to the underface of the table plate and the package to be tied located thereon.

11. Method of tying packages of desired size by mechanically knotting tying means thereabout, such as a tying cord, for the purpose of forming a weaver's knot, comprising the steps of: fixedly holding at a given spatially fixed clamping location an end of the cord removed from a supply source, then forming a section of the cord which merges with the fixedly held end thereof to substantially possess an inverted U-shaped configuration while now holding the cord end at a displaceable clamping location, supporting the middle region of the thus formed inverted U-shaped configured cord section upon a stationary support nose, placing the cord about the package to be tied, thereafter passing a section of the cord which merges with the supply source beneath said middle region of said inverted U-shaped configured cord section supported upon said stationary support nose, and fixedly holding the thus passed cord section at a distance from said middle portion at said given spatially fixed clamping location, then moving by means of a knotter unit said middle portion away from said stationary support nose and onto a movable support hook, next further moving such middle portion located at said movable support hook in the same direction in order to pull and tension the cord encircling the package to be tied therearound, thereafter engaging by means of a wrap-around mechanism the section of the cord extending from the movable support hook to said given location at which the last-mentioned cord section is fixedly held and cutting such cord section to separate it from the supply source, then placing the cut cord section by means of the wrap-around mechanism in the form of a loop about the legs of said U-shaped configured cord section extending away from said knotter unit and at the same time inserting such cut cord section in a protruding portion of the knotter unit, thereafter displacing the knotter unit such that said cut cord section is pulled between the loop formed by said middle portion and the loop formed by said wrap-around mechanism and beneath a section of the cord extending from the last-mentioned loop to the package in order to form a crossed weaver's knot, thereafter tensioning a leg of said U-shaped configured cord section which is still held fast at its end in order to tighten the loop formed by said middle portion, and finally freeing the aforementioned fixedly held leg to complete the work cycle.

12. Apparatus for tying packages of optional size with tying cord or the like while forming a weaver's knot, comprising a source of supply for tying cord, means for pulling the tying cord off its supply sources and for placing it around a package to be tied, spatially stationary means for clamping a free end of the tying cord payed off its supply source, means providing a stationary support nose for engaging the tying cord passing to said spatially stationary clamping means, displaceable looping means cooperating with said stationary support nose for forming a section of said tying cord into substantially inverted U-shaped configuration, means providing a displaceable clamping location for engaging a section of the cord extending from said stationary support nose to said spatially stationary clamping means, knotter means for disengaging the cord section engaged by said stationary support nose and said displaceable looping means, impact means cooperating with said displaceable clamping location-providing means for forming a shed, said impact means during shed formation contacting a cord section extending from said knotter means to said spatially stationary clamping means, wrap-around mechanism movable into said shed for engaging said cord section contacted by said impact means, cutter means for cutting said cord section engaged by said wrap-around mechanism in order to free said cord section from its supply source, said wrap-around mechanism cooperating with said knotter means to form a weaver's knot, and means for tightening the formed weaver's knot at the package being tied.

13. Apparatus for tying packages as defined in claim 12, further including a table plate for supporting the packages to be tied, said table plate having a longitudinal slot, said means for pulling the tying cord off its supply source comprising a curved arm mounted for to and fro movement and capable of extending into said slot, said curved arm having an aperture at its free end through which piercingly extends the tying cord from the supply source to said spatially stationary clamping means.

14. Apparatus for tying packages as defined in claim 12, wherein said spatially stationary clamping means comprises a stationarily mounted plate member provided with a bifurcated upper portion, a clamping slide having a slot at its free end slidably supported in said bifurcated upper portion.

15. Apparatus for tying packages as defined in claim 12, wherein said means providing said displaceable clamping location comprises a movably mounted guide element, a clamping hook provided at its free end with a slot slidably supported in said guide element.

16. Apparatus for tying packages as defined in claim 12, wherein said knotter means comprises a pivotably mounted plate member having a bifurcated upper portion, a knotter ram slidably mounted in said bifurcated upper portion, a knotter lever pivotably mounted to said knotter ram, said knotter lever including an arm portion providing a knotter tongue, said arm portion being provided with a transverse extending groove, a rigid retaining member cooperating with said knotter lever and affixed to said knotter ram.

17. Apparatus for tying packages as defined in claim 16, further including a support hook secured to said pivotably mounted plate member.

18. Apparatus for tying packages as defined in claim 16, further including drive means for said knotter means to enable controlled displacement of said knotter means so that the formed weaver's knot can be provided as desired with or without a knot opening loop.

19. Apparatus for tying packages as defined in claim 12, wherein said wrap-around mechanism comprises a support plate mounted for movement along a given path in a plane inclined to the horizontal, a guide sleeve carried by said support plate, and a looper-gripper slidably mounted in said guide sleeve.

20. Apparatus for tying packages as defined in claim 12, wherein said tightening means for the formed weaver's knot includes a cutter mechanism.

References Cited

UNITED STATES PATENTS

| | | | |
|---|---|---|---|
| 3,017,211 | 1/1962 | Trost | 289—3 |
| 3,179,453 | 4/1965 | Walters | 289—18 |

FOREIGN PATENTS

| | | |
|---|---|---|
| 1,130,353 | 5/1962 | Germany. |
| 947,093 | 1/1964 | Great Britain. |

MERVIN STEIN, *Primary Examiner.*

L. K. RIMRODT, *Assistant Examiner.*